United States Patent
Okazaki et al.

(10) Patent No.: US 9,542,795 B2
(45) Date of Patent: Jan. 10, 2017

(54) SWITCH UNIT AND GAME MACHINE

(75) Inventors: Ryoji Okazaki, Ichinomiya (JP); Eiji Yasuda, Mizuho (JP); Junya Fujita, Ichinomiya (JP)

(73) Assignee: OMRON Corporation, Kyoto (JP)

( * ) Notice: Subject to any disclaimer, the term of this patent is extended or adjusted under 35 U.S.C. 154(b) by 411 days.

(21) Appl. No.: 14/129,155

(22) PCT Filed: Mar. 14, 2012

(86) PCT No.: PCT/JP2012/056513
§ 371 (c)(1),
(2), (4) Date: Feb. 19, 2014

(87) PCT Pub. No.: WO2013/001857
PCT Pub. Date: Jan. 3, 2013

(65) Prior Publication Data
US 2014/0179429 A1    Jun. 26, 2014

(30) Foreign Application Priority Data

Jun. 29, 2011 (JP) ................................. 2011-144743

(51) Int. Cl.
*A63F 9/24* (2006.01)
*A63F 13/00* (2014.01)
(Continued)

(52) U.S. Cl.
CPC . *G07F 17/3209* (2013.01); *G06F 2203/04809* (2013.01)

(58) Field of Classification Search
CPC .............. G07F 17/3202; G07F 17/3204; G07F 17/3209; G07F 17/3211; G07F 17/3216; G07F 17/3223; G06F 2203/04809
See application file for complete search history.

(56) References Cited

U.S. PATENT DOCUMENTS

| 6,776,546 B2 * | 8/2004 | Kraus | ..................... B41J 5/102 345/172 |
| 2002/0054030 A1 * | 5/2002 | Murphy | ................ G06F 1/1626 345/173 |

(Continued)

FOREIGN PATENT DOCUMENTS

| JP | 02-306510 A | 12/1990 |
| JP | 03-238721 A | 10/1991 |

(Continued)

OTHER PUBLICATIONS

International Search Report for Application No. PCT/JP2012/056513 mailed Jun. 5, 2012 (4 Pages).

(Continued)

*Primary Examiner* — Milap Shah
(74) *Attorney, Agent, or Firm* — Nutter McClennen & Fish LLP; John J. Penny, V.; Ashley T. Brzezinski

(57) ABSTRACT

A switch unit is provided, comprising: a display part configured to display an image in at least one input area; an input part provided above the display part, the input part comprising a contact, wherein when the input part is pressed toward the at least one input area displayed on the display part, the contact corresponding to the input area is conducted; and an operating button configured to cause conduction of the contact of the input part, the contact corresponding to the input area, by a press-down operation toward the input area of the display part, wherein the operating button is made of a translucent rectangular parallelepiped member, and at least one side wall of the translucent rectangular parallelepiped member is formed into an inclined surface widening outwardly toward bottom of the operating button.

16 Claims, 16 Drawing Sheets

(51) Int. Cl.
*G06F 3/033* (2013.01)
*G06F 3/041* (2006.01)
*G07F 17/32* (2006.01)

(56) References Cited

U.S. PATENT DOCUMENTS

| | | | |
|---|---|---|---|
| 2004/0038721 A1* | 2/2004 | Wells | G07F 17/32 |
| | | | 463/16 |
| 2004/0134765 A1 | 7/2004 | Sotome | |
| 2005/0088417 A1* | 4/2005 | Mulligan | G06F 3/04886 |
| | | | 345/173 |
| 2005/0253821 A1* | 11/2005 | Roeder | G06F 1/1601 |
| | | | 345/173 |
| 2006/0256090 A1* | 11/2006 | Huppi | A63F 13/02 |
| | | | 345/173 |
| 2010/0026635 A1* | 2/2010 | Dimitrov | G06F 3/0202 |
| | | | 345/173 |
| 2010/0079403 A1* | 4/2010 | Lynch | G06F 3/0202 |
| | | | 345/174 |
| 2010/0110016 A1* | 5/2010 | Ladouceur | G06F 3/041 |
| | | | 345/173 |
| 2010/0321287 A1* | 12/2010 | Hine | A63F 13/06 |
| | | | 345/156 |
| 2010/0328203 A1* | 12/2010 | Hsu | G06F 1/1607 |
| | | | 345/157 |

FOREIGN PATENT DOCUMENTS

| | | |
|---|---|---|
| JP | 04-106822 A | 4/1992 |
| JP | 05-041134 A | 2/1993 |
| JP | 07-064688 A | 3/1995 |
| JP | 08-509318 A | 10/1996 |
| JP | 09-306277 A | 11/1997 |
| JP | 2003-123579 A | 4/2003 |
| JP | 2004-214101 A | 7/2004 |
| JP | 2005-111137 A | 4/2005 |
| JP | 2005-228569 A | 8/2005 |
| JP | 2006-042885 A | 2/2006 |
| JP | 2008-183189 A | 8/2008 |
| JP | 2010-055981 A | 3/2010 |
| JP | 2011-008392 A | 1/2011 |

OTHER PUBLICATIONS

Japanese Office Action for Application No. 2011-144743, issued Sep. 8, 2015 (6 pages).

* cited by examiner

SWITCH UNIT AND GAME MACHINE

CROSS-REFERENCE TO RELATED APPLICATION(S)

This application claims the benefit of priority from Japanese Patent Application No. 2011-144743, filed on 29 Jun. 2011, and International Application No. PCT/JP2012/056513, filed on 14 Mar. 2012 and designating the United States, the entire contents of which is incorporated herein by reference for all purposes.

BACKGROUND

The present invention relates to a switch unit, and particularly to a switch unit in which the operational feeling of a touch panel is improved and a game machine equipped with the same.

Conventionally, there has been a game machine called a slot machine. In a slot machine, a plurality of reels on each of which a plurality of types of symbols are displayed are spun. Then, a winning combination ("yaku") is determined on the basis of a matching pattern of symbols that are displayed when the reels are stopped and the matched symbols, and a prize is given according to the determined winning combination and the number of bets.

Further, operations such as the setting of the number of bets, and the spinning of the reels have been performed by pressing a button. More specifically, a player presses a bet button with his/her hand to determine the number of bets to be set. Further, when a player presses a reel spinning button with his/her hand, a win lottery result is determined. After the determination of the win lottery result, the spin of the reels is started, and the reels are automatically stopped.

In the meantime, a slot machine is placed, for example, in a casino. In a casino, not only slot machines manufactured by a single game machine manufacturer, but also slot machines manufactured by various game machine manufacturers are placed. A player selects a slot machine that suits his/her preference from slot machines manufactured by various game machine manufacturers, and plays the selected one. Therefore, each casino takes the business strategy to ensure superiority to its competitors by placing slot machines that are popular to players. Therefore, each game machine manufacturer makes efforts to provide slot machines that can attract the attention of players.

As one example, Patent Document 1 (Japanese Unexamined Patent Publication No. 2005-111137, published on Apr. 28, 2005) discloses a slot machine as a game machine that is provided with a display part including a touch panel. In this slot machine, a character and a numeric keypad are displayed on the display part, and the setting of the number of bets and the start of spin of reels are performed by using the touch panel.

However, in the configuration of the above conventional game machine, a player merely directly touches a screen of the touch panel. Therefore, unfortunately, it is not possible to provide an intuitive operational feeling to the player. The reason thereof is as follows.

In a game machine that includes a conventional push-button switch unit, a player presses down a push button by the number of bets to be set to thereby sensuously set the number of bets. However, in an operation of touching a screen of a touch panel, it is necessary to confirm on the screen as to whether the number of bets has been set by the touch in each operation. Therefore, a touch panel is inferior in operational feeling and click feeling to a conventional push button. Accordingly, it is not possible to provide an intuitive operational feeling. In addition, if each operation takes long time, a time required for a single game will be increased.

On the other hand, it is not preferred to make it difficult to view a display on a display part in order to solve such problems.

The present invention has been made in view of the above conventional problems, and is directed to provide a switch unit and a game machine that are capable of providing an intuitive operational feeling without making it difficult to view a display of a display part during an input operation.

SUMMARY

According to at least one embodiment of the present invention, a switch unit comprises a display part configured to display an image in at least one input area; an input part provided above the display part, the input part comprising a contact, wherein when the input part is pressed toward the at least one input area displayed on the display part, the contact corresponding to the input area is conducted; and an operating button configured to cause conduction of the contact of the input part, the contact corresponding to the input area, by a press-down operation toward the input area of the display part, wherein the operating button is made of a translucent rectangular parallelepiped member, and at least one side wall of the translucent rectangular parallelepiped member is formed into an inclined surface widening outwardly toward bottom of the operating button.

BRIEF DESCRIPTION OF THE DRAWINGS

FIG. 4D is a bottom view illustrating the configuration of the button case.

DETAILED DESCRIPTION

An embodiment of the present invention will be described with reference to FIGS. 1 to 17 as follows.

In the present embodiment, a switch unit used in a game machine such as a so-called slot machine will be described. However, the present invention is not limited to a slot machine. That is, the present invention can be applied to any devices that operate by receiving an operation by a user through a switch unit. For example, the game machine can also be applied to a card game machine such as a poker game machine and a mah-jong game machine.

Figure 2A:
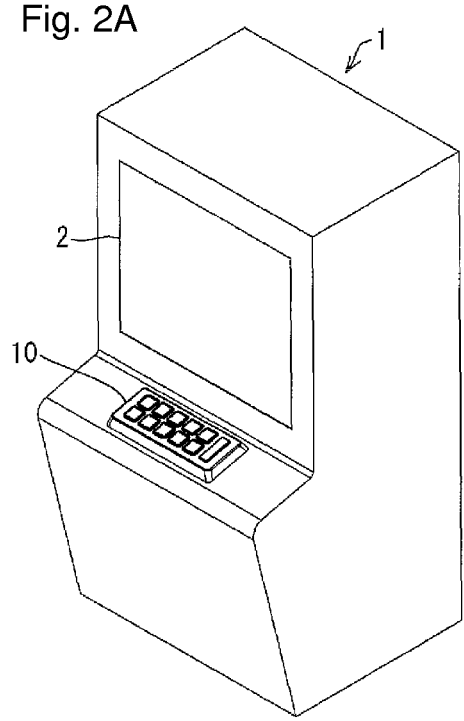
FIG. 2A is a perspective view illustrating the configuration of a slot machine as a game machine that is provided with the switch unit.
Figure 2C:
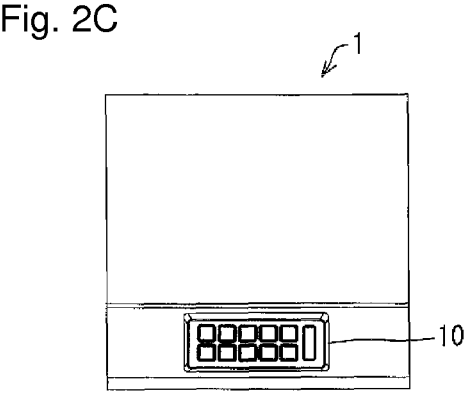
FIG. 2C is a plan view illustrating the configuration of the slot machine.
Figure 2B:
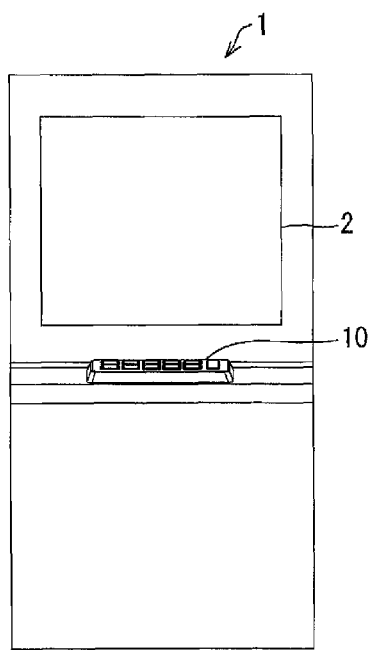
FIG. 2B is a front view illustrating the configuration of the slot machine.
Figure 2D:
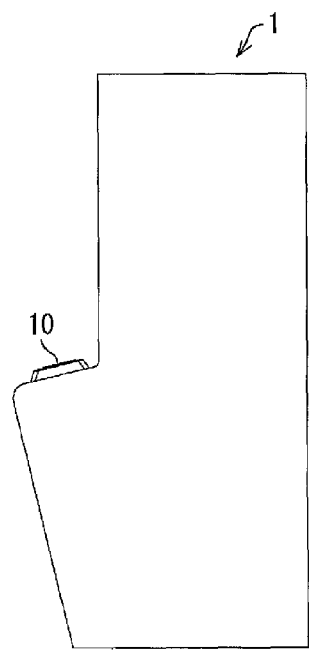
FIG. 2D is a right-side view illustrating the configuration of the slot machine.

First, a slot machine as a game machine that is provided with a switch unit of the present embodiment will be described with reference to FIGS. 2A to 2D. FIG. 2A is a perspective view illustrating the configuration of the slot machine as a game machine that is provided with the switch unit; FIG. 2B is a front view illustrating the configuration of the slot machine; FIG. 2C is a plan view illustrating the configuration of the slot machine; and FIG. 2D is a right-side view illustrating the configuration of the slot machine.

As illustrated in FIGS. 2A to 2D, a slot machine 1 includes a display monitor 2 which is provided at a position at the eye level of a player on the upper part of a casing, and a switch unit 10 which is provided at a position near the center of the casing on which a hand of a player is placed in such a manner that an operating part thereof is slightly inclined toward a player.

A plurality of reels are displayed on the display monitor 2. The reels can be spun by an operation by a player. According to symbols indicated on the stopped reels, a winning combination ("yaku") is determined. Then, a prize is given according to the determined winning combination. In the display of the reels, equivalents of the reels may be displayed on a display screen such as a liquid crystal display. Alternatively, the reels themselves may be arranged on the display monitor 2.

The switch unit 10 receives an operation by a player. In the present embodiment, the switch unit 10 receives operations such as an operation for specifying the number of bets and an operation for starting the spin of the reels when a player plays the slot machine 1.

Figure 3A:
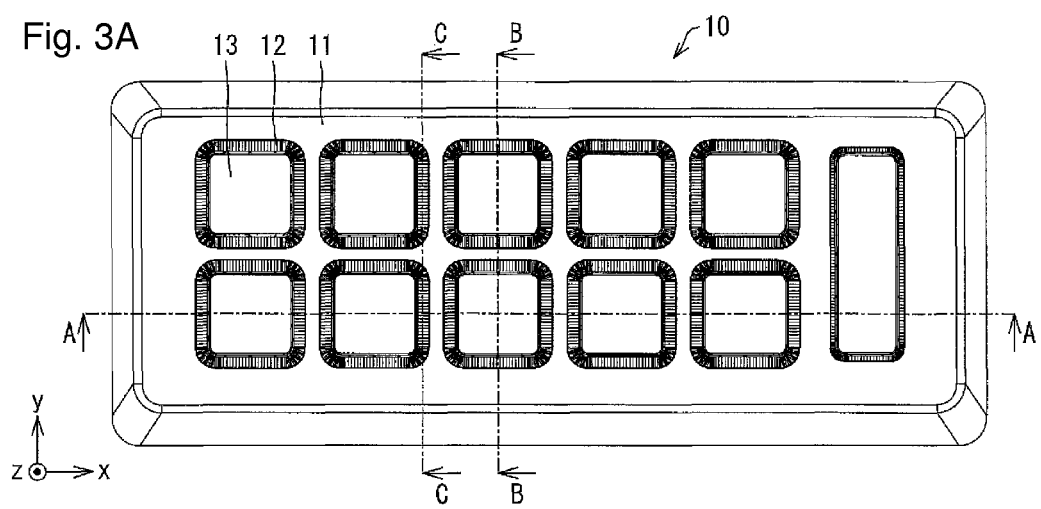
FIG. 3A is a plan view illustrating the configuration of the switch unit.
Figure 3B:
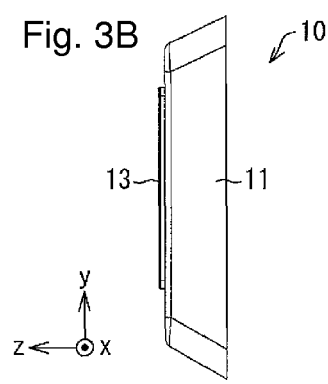
FIG. 3B is a side view of the switch unit.
Figure 3C:
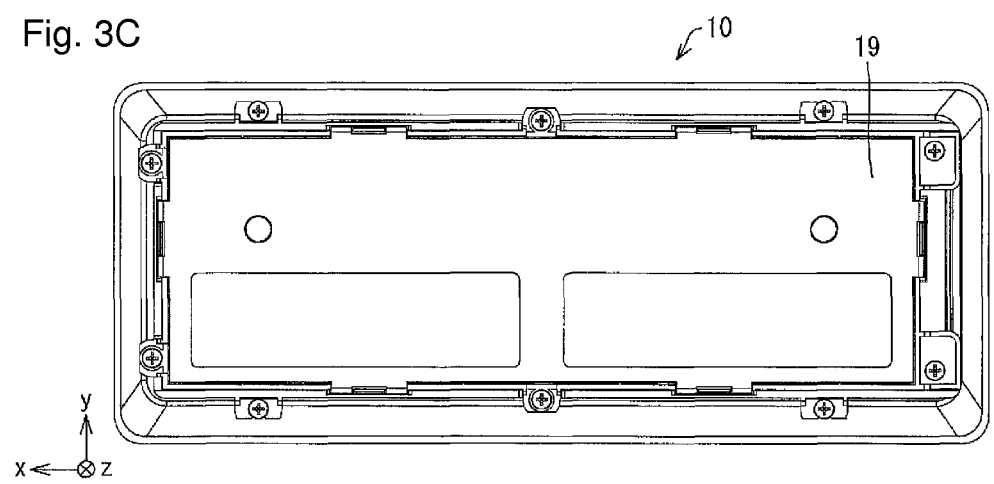
FIG. 3C is a bottom view of the switch unit.
Figure 4A:
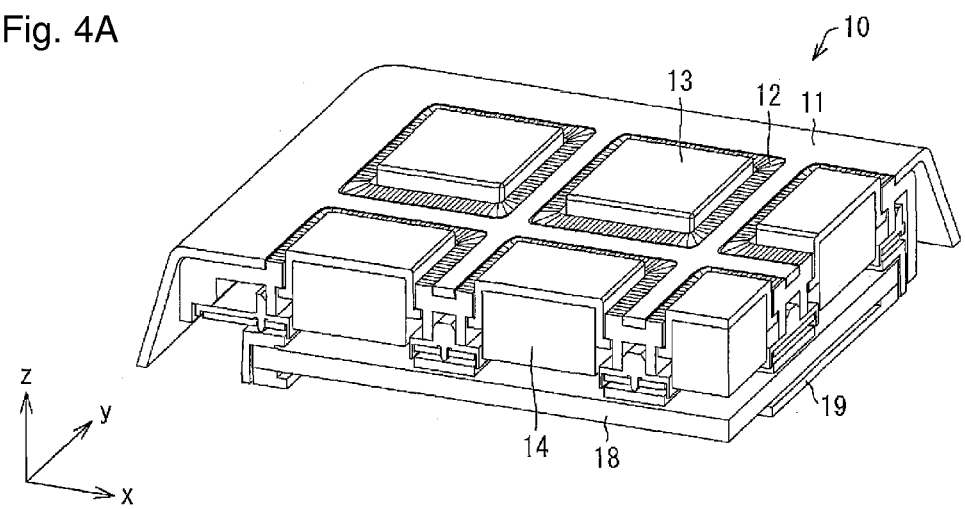
FIG. 4A is a perspective view taken along lines A-A and B-B of FIG. 3A illustrating a part of the internal configuration of the switch unit.
Figure 4B:
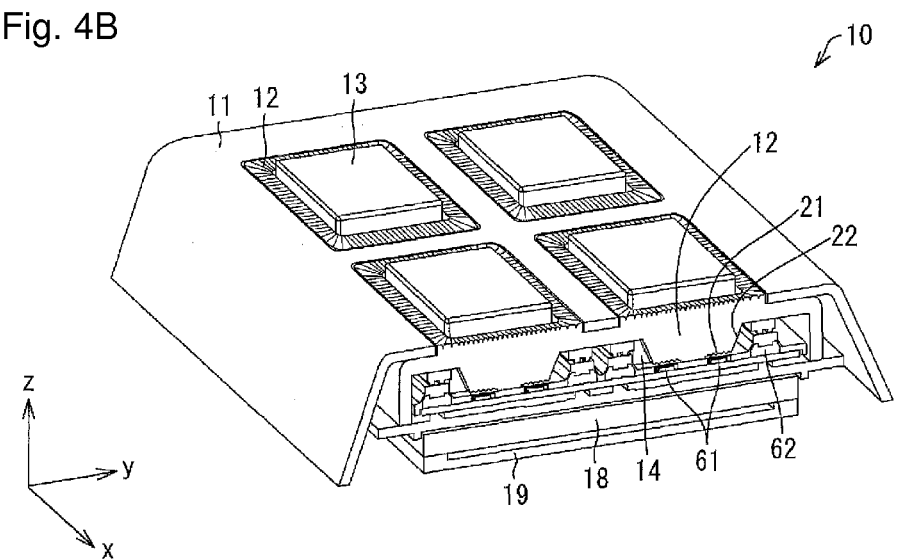
FIG. 4B is a perspective view taken along line C-C of FIG. 3A illustrating a part of the internal configuration of the switch unit.

The configuration of the switch unit 10 will be described with reference to FIGS. 3A to 3C, and FIGS. 4A and 4B. FIG. 3A is a plan view illustrating the appearance of the switch unit 10; FIG. 3B is a side view illustrating the appearance of the switch unit 10; and FIG. 3C is a bottom view illustrating the appearance of the switch unit 10. FIG. 4A is a perspective view taken along lines A-A and B-B of FIG. 3A illustrating the internal configuration of the switch unit 10; and FIG. 4B is a perspective view taken along line C-C of FIG. 3A illustrating the internal configuration of the switch unit 10. In the following description, the side same as an operating surface of the switch unit 10 is referred to as an upper side (top surface side), and the side opposite thereto is referred to as a lower side (bottom surface side). Further, a longitudinal direction when viewing the switch unit 10 from the upper side is referred to as an x direction, a lateral direction thereof is referred to as a y direction, and the upper direction of the switch unit 10 is referred to as a z direction.

The switch unit 10 can be separated from the slot machine 1. As illustrated in FIG. 3A, when viewing the separated switch unit 10 from the upper side (+z side) thereof, for example, eleven operating buttons 13 are arranged thereon, and an operating button case 12 surrounds the operating buttons 13. Further, a cover 11 covers the operating button case 12. As illustrated in FIG. 3B, and FIGS. 4A and 4B, when viewing the switch unit 10 from the lateral side thereof or obliquely, the operating buttons 13 protrude in the +z direction from the cover 11. As illustrated in FIG. 3C, when viewing the switch unit 10 from the bottom surface thereof, a base 19 can be viewed.

Figure 5:
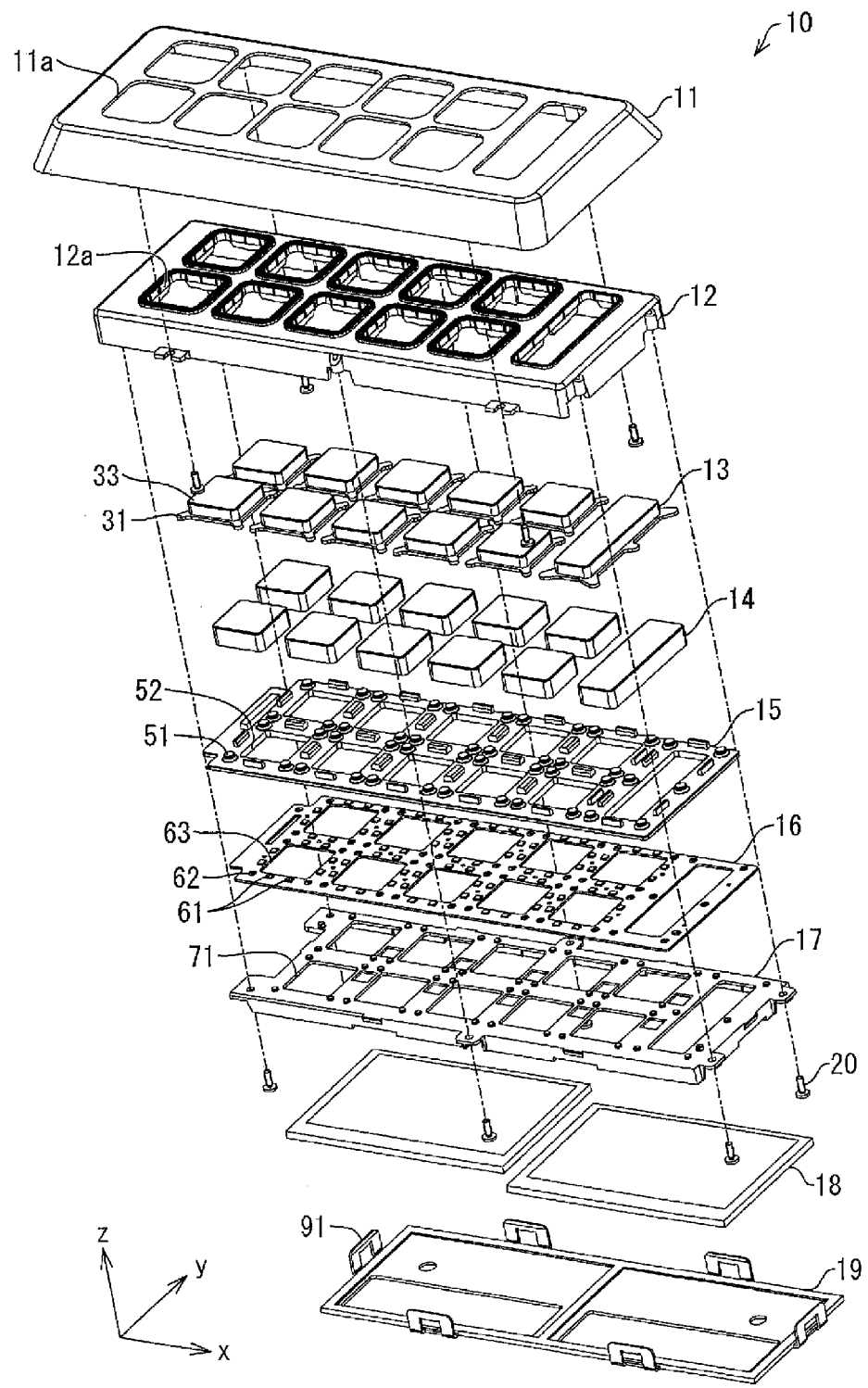
FIG. 5 is an exploded perspective view illustrating the configuration of the switch unit when viewed obliquely from above.
Figure 6:
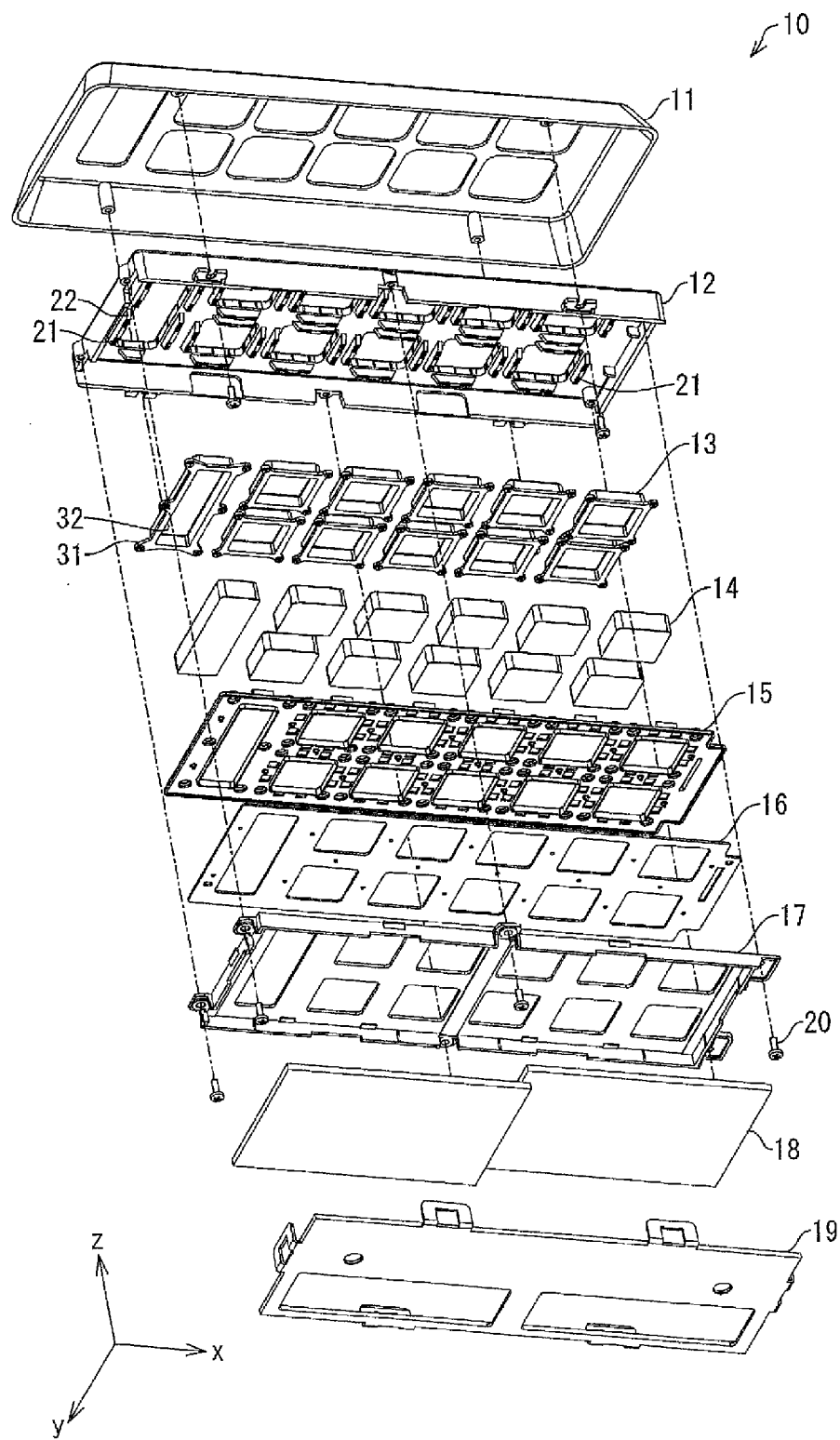
FIG. 6 is an exploded perspective view illustrating the configuration of the switch unit when viewed obliquely from below.
Figure 7A:
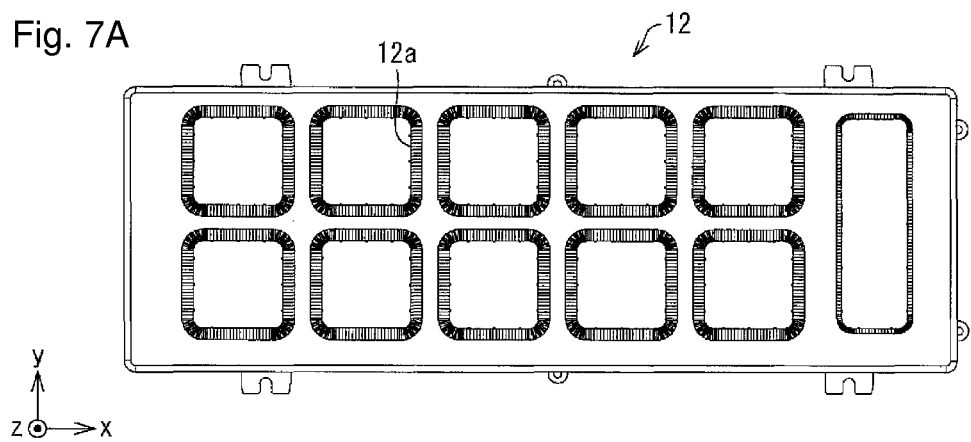
FIG. 7A is a plan view illustrating the configuration of a button case in the switch unit.
Figure 7B:
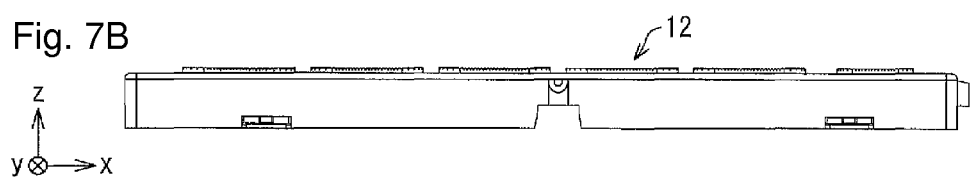
FIG. 7B is a front view illustrating the configuration of the button case.
Figure 7C:
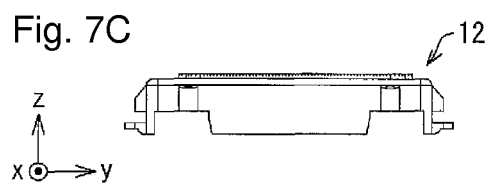
FIG. 7C is a side view illustrating the configuration of the button case.
Figure 7D:
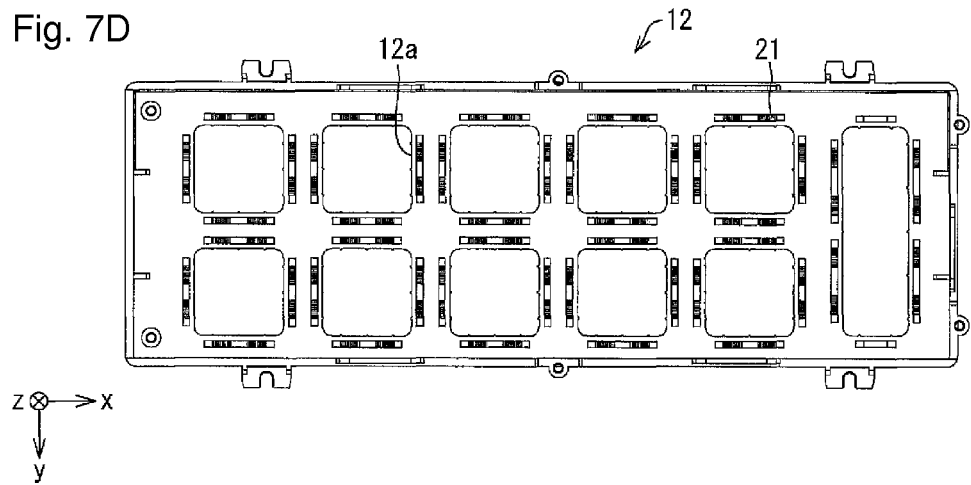
Figure 8A:
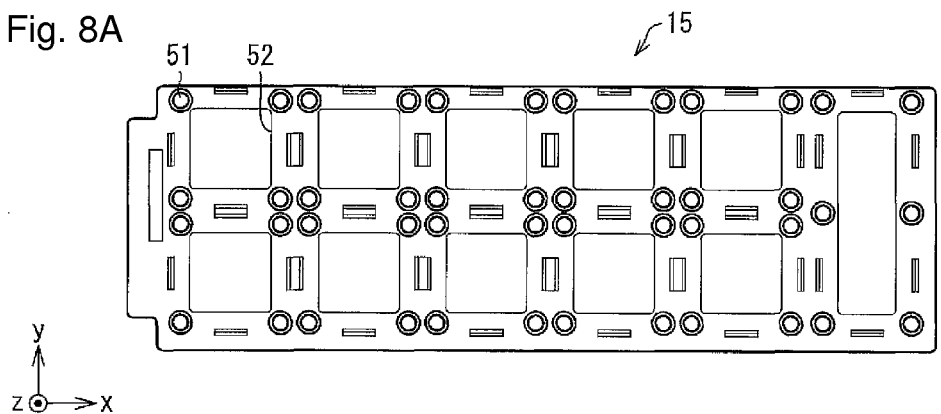
FIG. 8A is a plan view illustrating the configuration of a rubber in the switch unit.
Figure 8B:
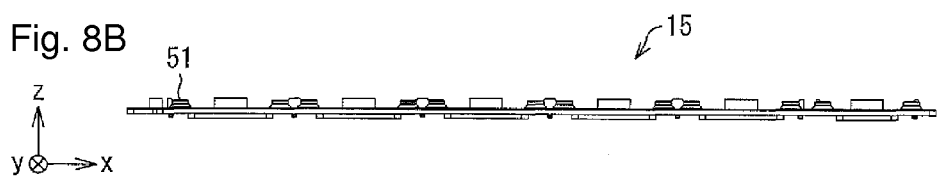
FIG. 8B is a front view illustrating the configuration of the rubber.
Figure 8C:
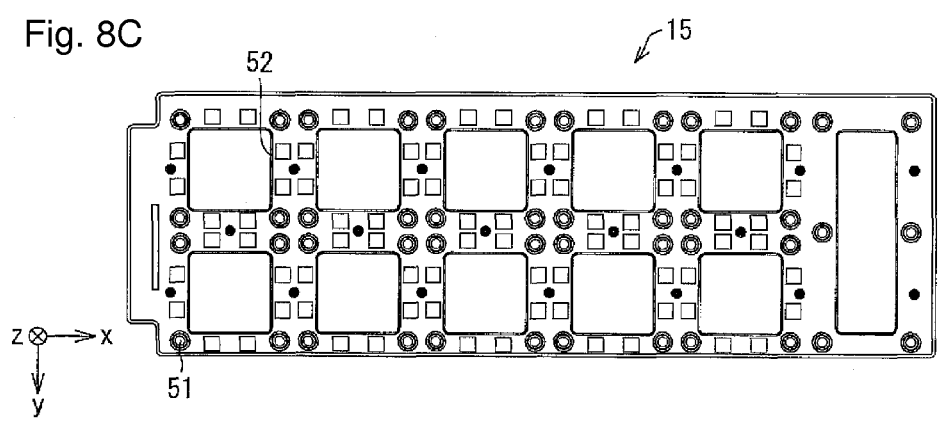
FIG. 8C is a bottom view illustrating the configuration of the rubber.
Figure 9A:
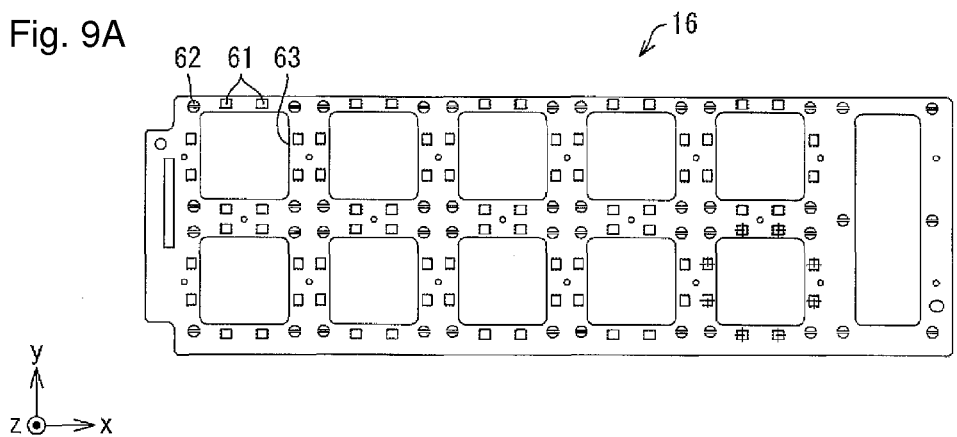
FIG. 9A is a plan view illustrating the configuration of a PCB in the switch unit.
Figure 9B:
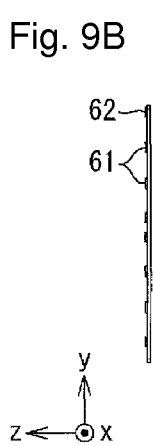
FIG. 9B is a side view illustrating the configuration of the PCB.
Figure 9C:
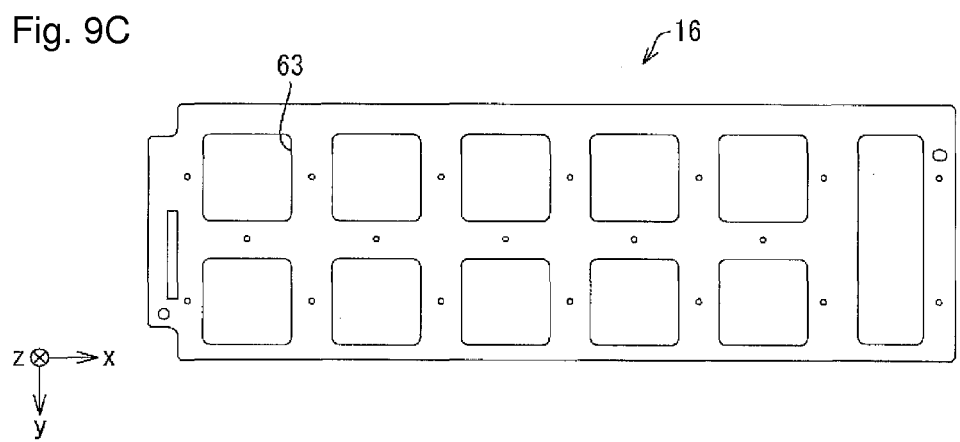
FIG. 9C is a bottom view illustrating the configuration of the PCB.
Figure 10A:
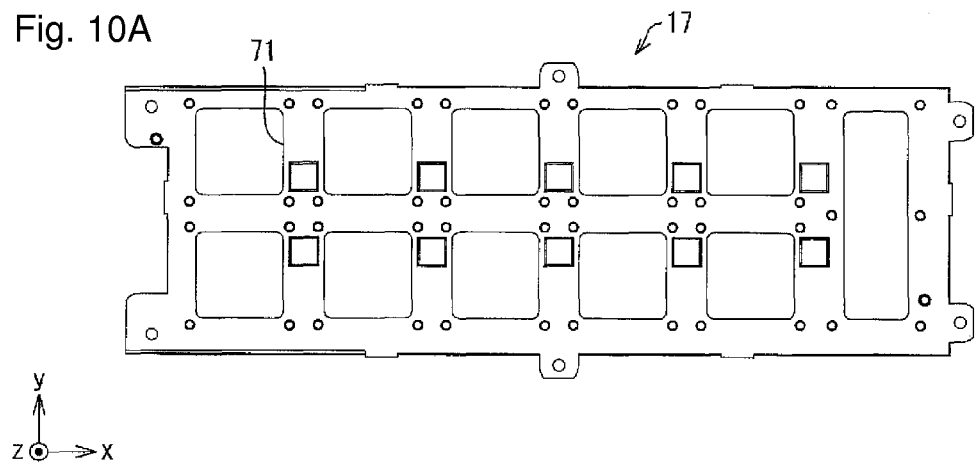
FIG. 10A is a plan view illustrating the configuration of an LCD case in the switch unit.
Figure 10B:
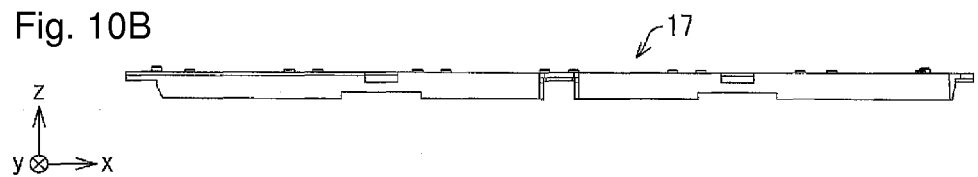
FIG. 10B is a front view illustrating the configuration of the LCD case.
Figure 10C:
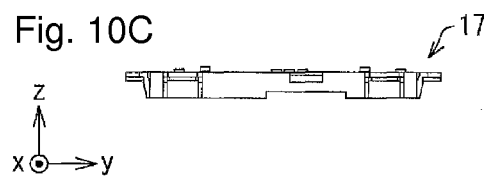
FIG. 10C is a side view illustrating the configuration of the LCD case.
Figure 10D:
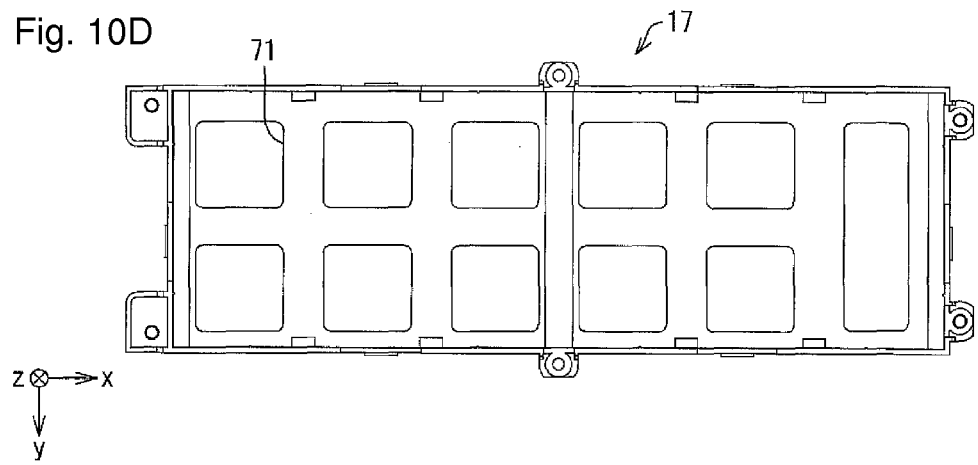
FIG. 10D is a bottom view illustrating the configuration of the LCD case.
Figure 11A:
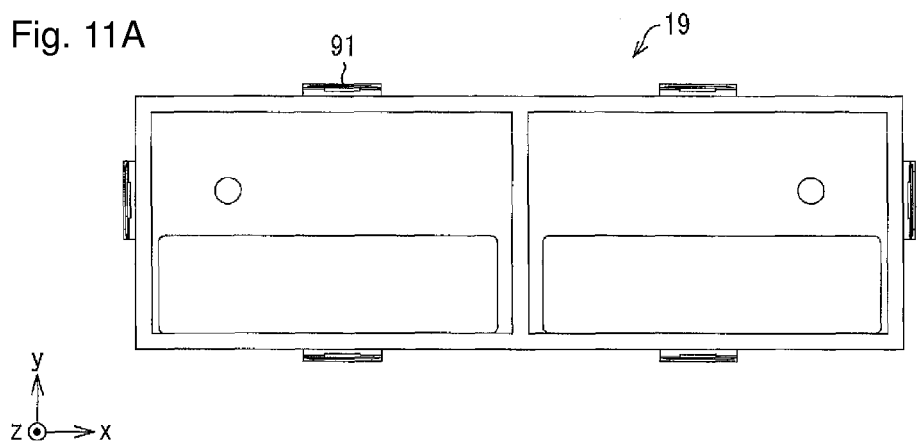
FIG. 11A is a plan view illustrating the configuration of a base in the switch unit.
Figure 11B:
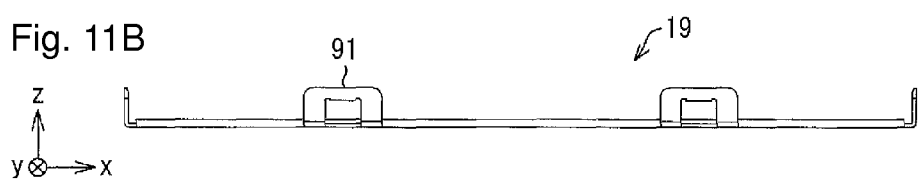
FIG. 11B is a front view illustrating the configuration of the base.
Figure 11C:
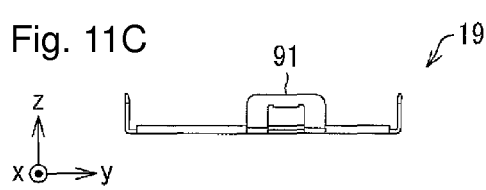
FIG. 11C is a side view illustrating the configuration of the base.
Figure 11D:
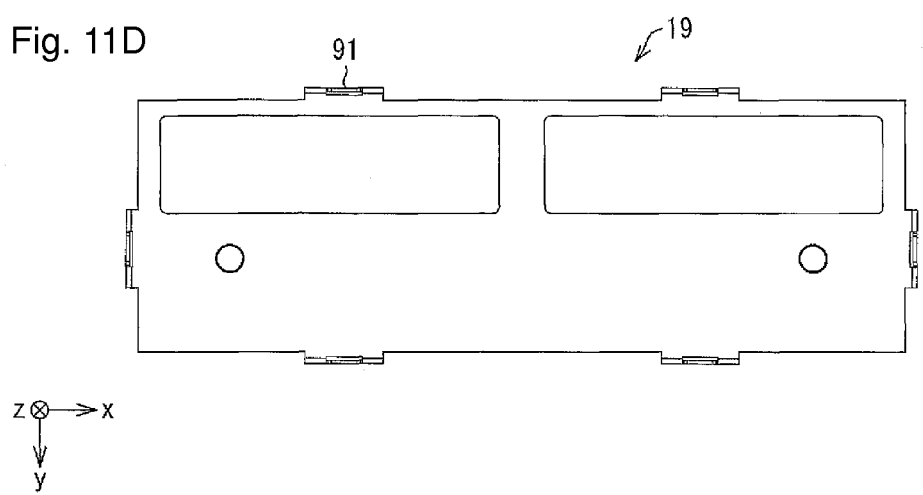
FIG. 11D is a bottom view illustrating the configuration of the base.

The detailed configuration of the switch unit 10 will be described with reference to FIGS. 5 and 6. FIG. 5 is an exploded perspective view illustrating the configuration of the switch unit 10 when viewed obliquely from above. FIG. 6 is an exploded perspective view illustrating the configuration of the switch unit 10 when viewed obliquely from below.

As shown in FIGS. 5 and 6, the switch unit 10 includes the cover 11, the operating button case 12, the operating buttons 13, lenses 14, a rubber 15 as an elastic member, a printed circuit board (PCB) 16 as an input part, a liquid crystal display (LCD) case 17, an LCD 18 as a display part, and the base 19 which are arranged in this order from the top (from the +z direction). The operating button case 12 and the LCD case 17 are fixed to each other with screws 20, and the cover 11 and the operating button case 12 are also fixed to each other with screws 20. In the embodiment of the present invention, the cover 11, the lenses 14, the rubber 15, the LCD case 17, and the base 19 can be omitted.

The cover 11 is formed of, for example, a synthetic resin such as plastic. The operating button case 12 is formed of, for example, glass, plastic or the like. The cover 11 and the operating button case 12 respectively have the same number of openings 11a and openings 12a as the number of the operating buttons 13, the openings 11a and the openings 12a being formed at positions corresponding to the positions of the respective operating buttons 13. Accordingly, the operating buttons 13 protrude above the cover 11 through the openings 11a and the openings 12a, and are loosely fitted so as to be freely pressed down. In the present embodiment, an example in which the number of the provided operating buttons 13 is eleven is described. However, the number of operating buttons 13 is not limited thereto. The number of operating buttons 13 may be less or more than eleven, or may also be one.

As illustrated in FIGS. 7A to 7D, for example, light diffusion portions 21 and light guide portions 22 are provided in the operating button case 12. Light emitted from later-described light-emitting diodes (LEDs) 61 which are provided in the PCB 16 illuminates areas surrounding the respective operating buttons 13 by virtue of the light diffusion portions 21 and the light guide portions 22. The light guide portions 22 allow light to illuminate only the areas surrounding the operating buttons 13, and do not allow light to reach the operating buttons 13 themselves. That is, as illustrated in FIG. 4B, the operating button case 12 is provided with the light diffusion portions 21 which have rough surfaces and face the LEDs 61, and the light guide portions 22 which are formed so as to extend around the operating buttons 13 from the light diffusion portions 21 and made of solid resin.

Each of the operating buttons 13 has contact pressing portions 31 which protrude from the lower four corners thereof. On the other hand, the PCB 16 has carbon contacts 62 as contacts which are provided at positions directly below the respective contact pressing portions 31. Therefore, when an operating button 13 is pressed down, a contact pressing portion 31 of the operating button 13 applies pressing force to a carbon contact 62 through a projection 51 of the rubber 15. Accordingly, a conductive plate (not shown) which is provided on the back of the projection 51 comes into contact with two electrodes (not shown) which are provided with a space therebetween. The PCB 16 thereby recognizes that there has been conduction of the carbon contact 62 at this position. As a result, the PCB 16 can detect that the operating button 13 that is located above the carbon contact 62 at this position has been pressed down. In the present embodiment, since the carbon contacts 62 of the PCB 16 cannot be viewed from the upper side of the switch unit 10, the carbon contacts 62 are not necessarily transparent electrodes. Therefore, from this point of view, a general touch panel input device is not used in the switch unit 10 of the present embodiment.

In the present embodiment, the inner part of each of the operating buttons 13 is formed into a recess 32. Each of the lenses 14 is provided so as to be fitted with the recess 32. This makes it possible to show an image (a picture, character, etc.) displayed by the LCD 18 as being displayed on an operating surface 33 which is the top surface of each of the operating buttons 13. The detailed configuration of the operating button 13 will be described later. Each of the lenses 14 has, for example, a cubic shape so as to be fitted with the recess 32 of the corresponding operating button 13. Each of the lenses 14 is a convex lens that can show an image displayed on the LCD 18 as being displayed on the top surface of the corresponding operating button 13.

As described above, the rubber 15 is arranged under (at the −z direction side) the operating buttons 13. Accordingly, when an operating button 13 is pressed down, the operating button 13 is pushed down in the +z direction, and then can also be pushed back in the −z direction. That is, it is possible to provide a pressing feeling of the operating button 13.

The rubber 15 is made of an elastic member such as silicone rubber, and has a transparent color or a nearly transparent color such as translucent white. As illustrated also in FIGS. 8A to 8C, the rubber 15 has openings 52 which are formed at positions corresponding to the positions of the respective operating buttons 13. Further, the rubber 15 has projections 51 which are provided at positions corresponding to the positions of the respective contact pressing portions 31 of the operating buttons 13. The contact pressing portions 31 of the operating buttons 13 are in contact with the respective projections 51. When an operating button 13 is pressed down, a contact pressing portion 31 of the operating button 13 compresses a projection 51 that is in contact therewith. As a result, the contact pressing portion 31 comes into contact with the carbon contact 62 opposed thereto. Further, since the projection 51 has elasticity, the projection 51 presses back the contact pressing portion 31 after being compressed by the contact pressing portion 31. Accordingly, the operating buttons 13 serve as push buttons.

The PCB 16 is a printed circuit board on which necessary wirings are formed. The PCB 16 detects the pressing-down of an operating button 13, and thereby performs predetermined processing. As illustrated also in FIGS. 9A to 9C, the PCB 16 has openings 63 which are formed at positions corresponding to the positions of the respective operating buttons 13. In addition, as described above, the PCB 16 has the carbon contacts 62 which are provided at positions corresponding to the positions of the respective contact pressing portions 31 of the operating buttons 13. Further, in the PCB 16, two LEDs 61 are provided on each side in the x direction and in the y direction around each of the openings 63.

The LCD case 17 protects the top surface of the LCD 18. As illustrated in FIGS. 10A to 10D, the LCD case 17 has openings 71 which are formed at positions corresponding to the positions of the respective operating buttons 13.

The LCD 18 is a liquid crystal display device that displays a predetermined image such as a picture and character thereon.

The base 19 covers the back surface of the switch unit 10. As illustrated in FIGS. 11A to 11D, the base 19 has LCD fixing portions 91 for fixing the LCD 18. Specifically, two LCD fixing portions 91 are provided on each longitudinal side of the base 19, and one LCD fixing portion 91 is provided on each lateral side thereof.

In the configuration of the switch unit 10, the operating button case 12 and the operating button 13 are provided above the PCB 16. The operating button 13 causes conduction of a carbon contact 62 of the PCB 16, the carbon contact corresponding to an input area of the LCD 18, as a result of a press-down operation toward the input area. Therefore, since a pressing operation to the PCB 16 is performed through the physical operating button 13, an intuitive operational feeling and a click feeling can be obtained by pressing down the operating button 13.

As a result, an operation can be performed by a physical action as pressing down the operating button 13. Therefore, it is not necessary to visually confirm as to whether the operation has been completed in each operation. Accordingly, a switch unit 10 that can provide a speed feeling and a quick feeling can be provided.

Further, the switch unit 10 can illuminate the areas surrounding the respective operating buttons 13 and display various pieces of information (characters, pictures, etc.) on the top surfaces of the operating buttons 13 while maintaining an operational feeling and a quick feeling like a push button. As a result, the switch unit 10 can provide a user interface that attracts customers while maintaining the advantages of a push-button switch unit.

In other words, in the switch unit 10 of the present embodiment, it is possible to give an operational feeling that cannot be provided by a touch panel to a player. In addition, it is possible to provide the switch unit 10 that is attractive to a player by displaying an image displayed on the LCD 18 on each of the operating buttons 13 and illuminating the areas surrounding the respective operating buttons 13.

Figure 1:
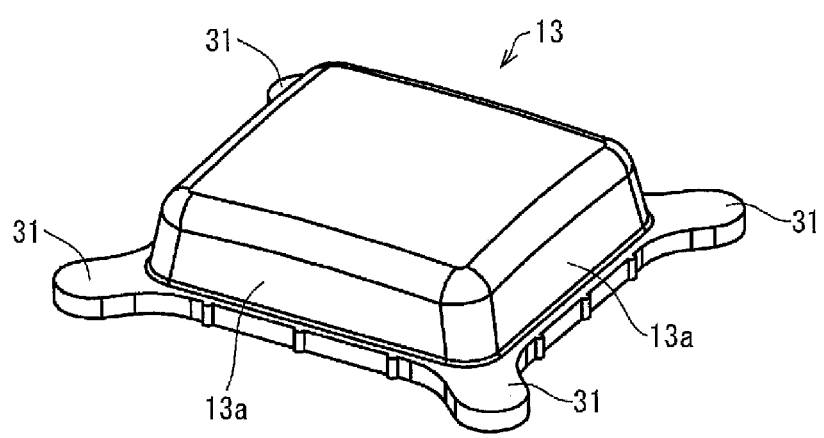
FIG. 1 is a perspective view illustrating an embodiment of a switch unit of the present invention, specifically, illustrating the configuration of an operating button of the switch unit.

Next, the configuration of the operating button 13 will be described with reference to FIG. 1. FIG. 1 is a perspective view illustrating the configuration of the operating button 13.

The operating button 13 is formed of transparent plastic or the like. As shown in FIG. 1, the operating button 13 is made of a rectangular parallelepiped member. The rectangular parallelepiped member may have a cavity on the inner part thereof. By virtue of the lens 14 fitted with the cavity, it is possible to show an image displayed on the LCD 18 as being displayed on the top surface of the operating button 13 through the lens 14.

The operating button 13 has the contact pressing portions 31 formed on the lower four corners of the bottom surface thereof. As described above, when a contact pressing portion 31 is pressed down, the pressed-down contact pressing portion 31 presses the carbon contact 62 opposed thereto of the PCB 16 through the rubber 15. As a result, it is possible to detect that the operating button 13 has been pressed down.

The operating button 13 is made of a translucent rectangular parallelepiped member. Therefore, as illustrated in FIG. 12B, when a side wall 13*a* of the three-dimensional operating button 13 made of a rectangular parallelepiped member is vertically formed, an image in an input area displayed on the LCD 18 is reflected by the side wall 13*a* of the three-dimensional operating button 13 made of a rectangular parallelepiped member, and thereby enters the visual field of a player. As a result, the image in the input area displayed on the LCD 18 is viewed doubly, which makes it difficult to view the display. When the switch unit 10 is placed in an inclined manner, the side wall 13*a* of the operating button 13 is inclined. Therefore, this phenomenon is further enhanced. In particular, a display on the side wall 13*a* of the operating button 13, the side wall 13*a* positioned on the far side with respect to a player, becomes difficult to view. In addition, a deeper sense of the image is thereby caused.

Figure 12A:
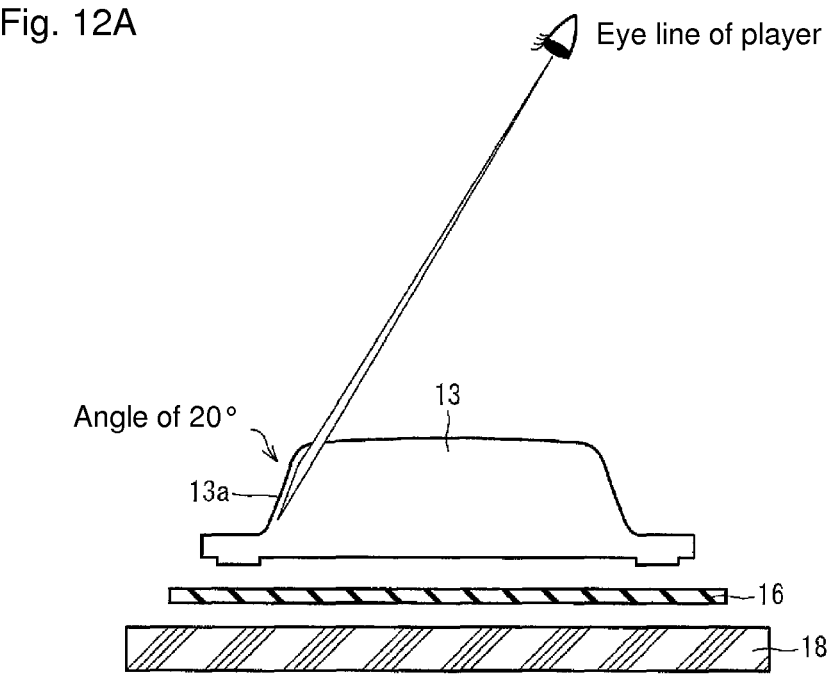
FIG. 12A is an explanatory drawing illustrating the visibility of an operating button that has an inclined surface.
Figure 12B:
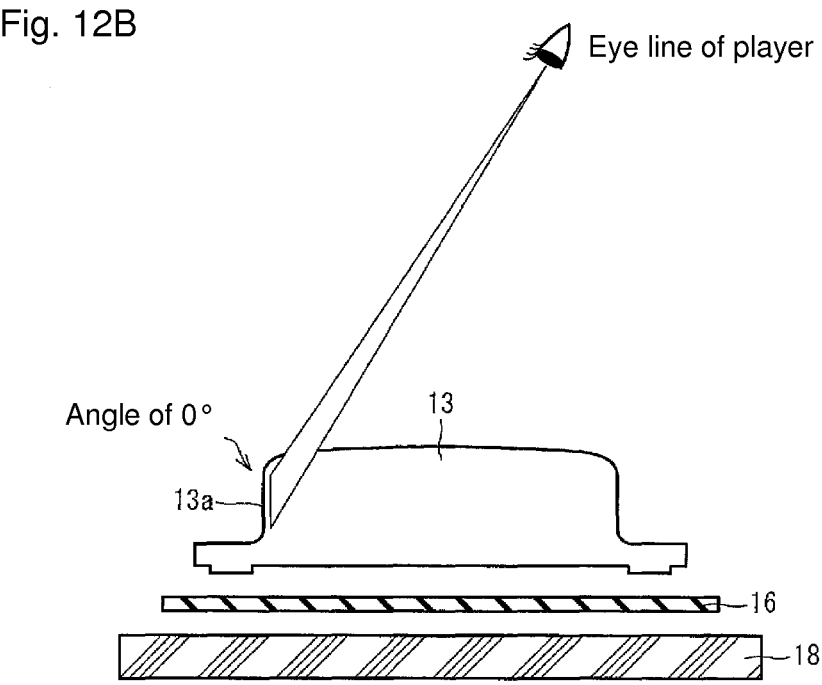
FIG. 12B is an explanatory drawing illustrating the visibility of an operating button that does not have an inclined surface.

In view of this, as illustrated in FIG. 12A and FIG. 1, at least one side wall 13*a* of the operating button 13 made of a rectangular parallelepiped member is formed into an inclined surface that widens outwardly toward the bottom in the present embodiment. The inclined surface is inclined at an angle of, for example, 10 to 20° with respect to a vertical surface so as to form an obtuse angle downward. In FIG. 1, there are two inclined surfaces in each side surface of the operating button 13, the inclined surfaces including the inclined surface of the side wall 13*a* and a chamfered inclined surface formed on each side of the top surface of the operating button 13. The inclined surface of the embodiment of the present invention mainly refers to the inclined surface of the side wall 13*a* including each side of the bottom surface of the operating button 13. However, the inclined surface of the embodiment of the present invention may include the chamfered inclined surface.

Therefore, by arranging the inclined surface which is formed on one side wall 13*a* and widens outwardly toward the bottom on the far side with respect to a player, it is possible to prevent light reflected by the side wall 13*a* from entering eyes of a player. In addition, a deeper sense of an image can also be reduced.

Therefore, it is possible to provide the switch unit 10 and the slot machine 1 that are capable of providing an intuitive operational feeling without making it difficult to view a display on the LCD 18 during an input operation.

When considering a case where inclined surfaces are formed on two side walls 13*a* of the operating button 13 made of a rectangular parallelepiped member, light reflected by side walls 13*a* positioned front and back with respect to a player is likely to enter eyes of the player.

Figure 13:
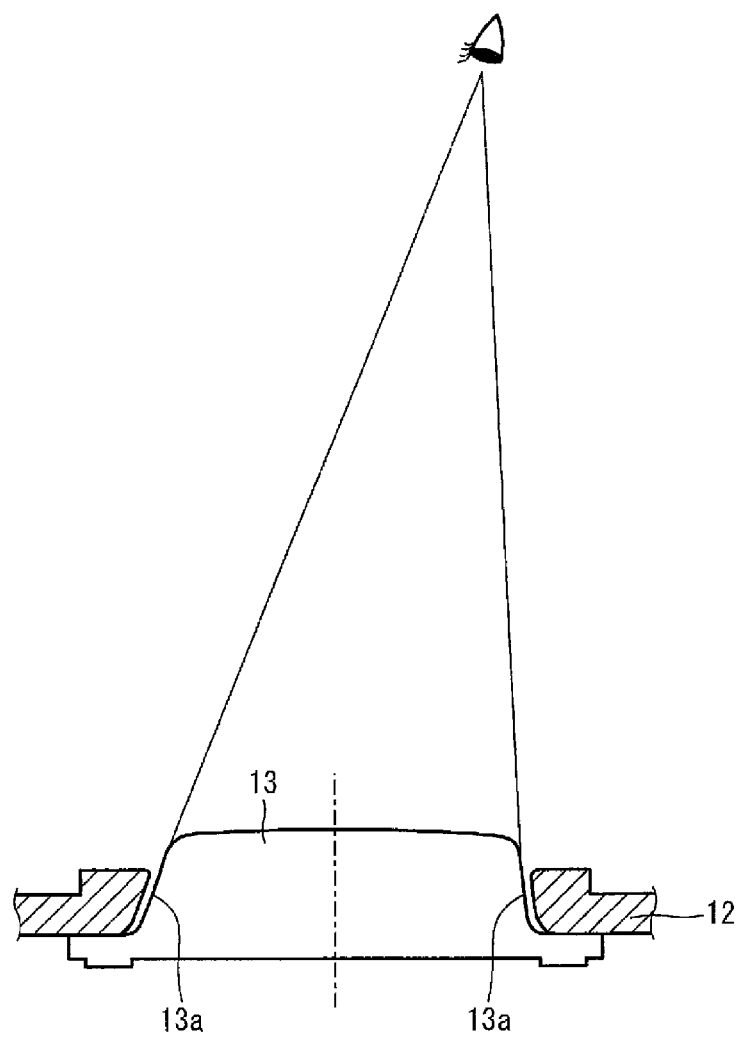
FIG. 13 is a cross-sectional view illustrating an operating button that has inclined surfaces formed on the respective front and back side walls thereof, and the angle of an inclined surface on the back side wall with respect to a player is larger than the angle of an inclined surface on the front side wall.

In view of this, in the present embodiment, inclined surfaces each of which widens outwardly toward the bottom can be formed on at least a pair of opposite side walls 13*a* of the operating button 13 made of a rectangular parallelepiped member. As a result, it is possible to prevent light reflected by the front and back side walls 13*a* from entering eyes of a player. Specifically, in the front and back side walls 13*a*, light reflected by the back side wall is more likely to enter eyes of a player than light reflected by the front side wall. Therefore, as illustrated in FIG. 13, an inclined angle of one inclined surface on the back side wall 13*a* can be made larger than an inclined angle of the other inclined surface on the front side wall 13*a* in the present embodiment. As a result, it is possible to appropriately prevent light reflected by the front and back side walls from entering eyes of a player.

Further, in the switch unit 10 of the present embodiment, four side walls 13*a* of the operating button 13 made of a rectangular parallelepiped member can be formed into inclined surfaces each of which widens outwardly toward the bottom.

Figure 14:
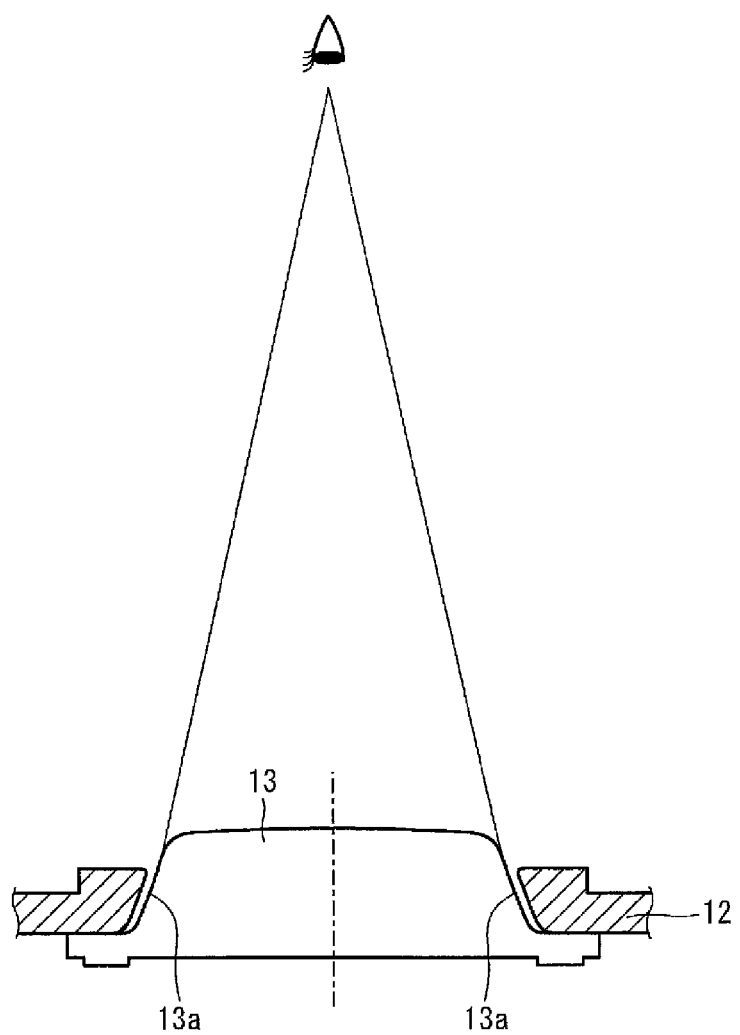
FIG. 14 is a cross-sectional view illustrating the visibility of an operating button that has inclined surfaces formed on the four side walls thereof when viewed from above.

That is, when viewing the operating button 13 in the switch unit 10 that is horizontally placed from above, light reflected by the front, back, right and left side walls 13*a* enters eyes. Therefore, as illustrated in FIG. 14, the front, back, right and left side walls 13*a* of the operating button 13 are formed into inclined surfaces each of which widens outwardly toward the bottom in the present embodiment. As a result, it is possible to prevent light reflected by the front, back, right and left side walls 13*a* of the operating button 13 from entering eyes. In addition, since shadows of the side walls 13*a* reflected around an image are made invisible, a deeper sense of the image can be reduced.

In the switch unit 10 of the present embodiment, as illustrated in FIGS. 5 and 6, the rubber 15 is provided between the operating button 13 and the PCB 16. In addition, as illustrated in FIG. 1, the operating button 13 has the contact pressing portions 31 formed on the lower four corners thereof. Further, as illustrated in FIG. 16 which will be described later, a cavity 51*a* is formed on the projection 51 of the rubber 15 at a part or all of positions that make contact with the contact pressing portions 31 formed on the lower four corners of the operating button 13.

Accordingly, when the operating button 13 is pressed down, and the contact pressing portions 31 formed on the lower four corners of the operating button 13 come into contact with the rubber 15, a part of the rubber 15 where the cavity 51*a* formed on the projection 51 exists is dented, and the dented part presses the carbon contact 62 opposed thereto of the PCB 16. Therefore, the elasticity due to the existence of the cavity 51*a* formed on the projection 51 in the rubber 15 provides a moderate press-down feeling to the operating button 13. As a result, a further intuitive operational feeling and click feeling can be provided.

Figure 15:
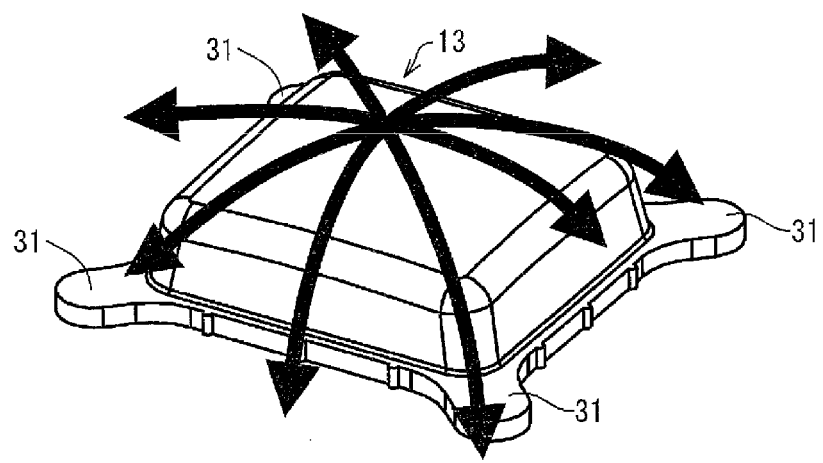
FIG. 15 is an explanatory drawing illustrating the operation of a four input contact type operating button.

As described above, the operating button 13 of the present embodiment has the contact pressing portions 31 formed on the lower four corners thereof. As a result, as illustrated in FIG. 15, the operating button 13 can operate in all directions toward the four corners thereof. Therefore, a press-down behavior of the operating button 13 is not stable. As a result, the contact pressing portions 31 of the operating button 13 and the carbon contacts 62 of the PCB 16 corresponding to one input area of the LCD 18 are caused to successively make contact with each other, namely, multi-point contact occurs.

Figure 16:
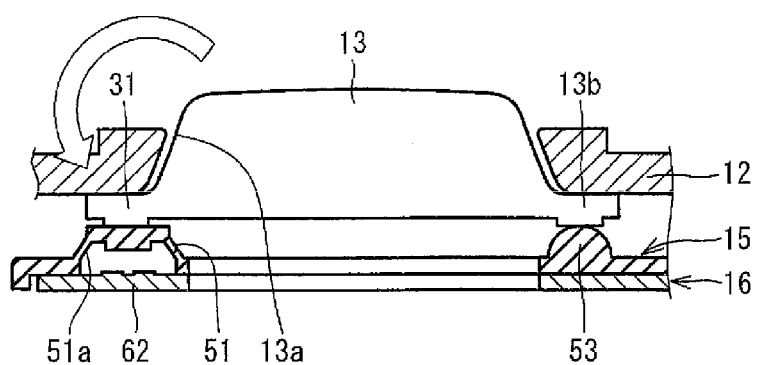
FIG. 16 is a cross-sectional view illustrating the configuration of an operating button having a cantilever structure.

Therefore, as illustrated in FIG. 16, the operating button 13 made of a rectangular parallelepiped member may have support ends 13b on one side thereof, and may therefore be provided so as to be freely pressed down by pivoting around the support ends 13b on one side in the present embodiment. The support ends 13b are preferably formed on a side of the operating button 13, the side being positioned at the far side with respect to a player, in view of operability.

Specifically, as illustrated in FIG. 16, circular cross-section projections 53 as support/fixation points of the rubber 15 are formed below the respective support ends 13b of the operating button 13. Accordingly, the operating button 13 turns around each of the support ends 13b in the direction indicated by a void arrow along the circular cross-section of each of the circular cross-section projections 53, and presses down the projection 51 on the front side (the side closer to a player) of the rubber 15. At this point, when the front side wall 13a of the operating button 13 is a vertical wall, the front side wall 13a may make contact with the opening 12a of the operating button case 12 when the operating button 13 turns. However, in the present embodiment, the side wall 13a is formed into an inclined surface. Therefore, the side wall 13a of the operating button 13 does not make contact with the opening 12a when the operating button 13 turns.

Figure 17:
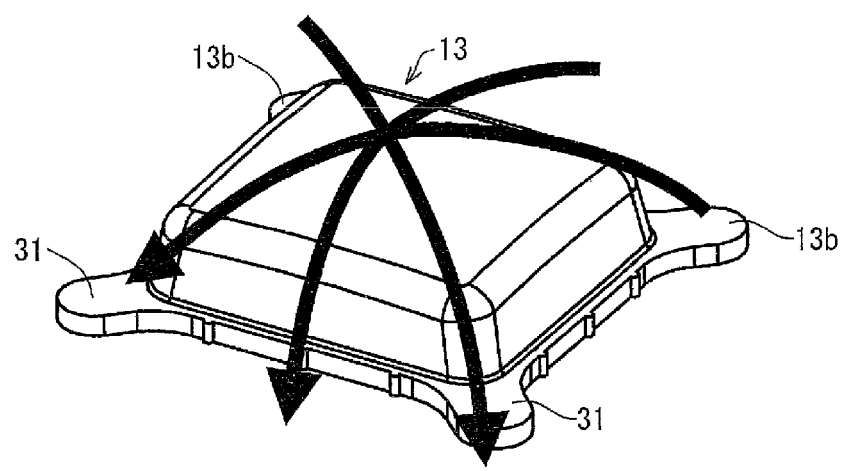
FIG. 17 is an explanatory drawing illustrating the operation of the operating button having a cantilever structure.

As a result, when a contact input is employed, since the operating button 13 has a cantilever structure, it is possible to prevent multi-point contact and provide a stable press-down feeling by reducing the number of press-down contacts by virtue of the cantilever structure as illustrated in FIG. 17.

In FIG. 16, structures in the rubber 15, the structures being positioned below the contact pressing portions 31 positioned on the back side of the operating button 13, are the circular cross-section projections 53 as support/fixation points. However, the structures are not limited thereto. For example, each of the support/fixation points can be formed by inserting a nonconductive spacer as a filler into the cavity 51a of the projection 51 of the rubber 15. As a result, it is not necessary to form the circular cross-section projections 53 on the rubber 15, and it is therefore possible to prevent the number of components from increasing.

Disclosed is a switch unit comprising: a display part configured to display an image in at least one input area; an input part provided above the display part, the input part comprising a contact, wherein when the input part is pressed toward the at least one input area displayed on the display part, the contact corresponding to the input area is conducted; and an operating button configured to cause conduction of the contact of the input part, the contact corresponding to the input area, by a press-down operation toward the input area of the display part, wherein the operating button is made of a translucent rectangular parallelepiped member, and at least one side wall of the translucent rectangular parallelepiped member is formed into an inclined surface widening outwardly toward bottom of the operating button.

According to the embodiment of the invention, the operating button which causes conduction of the contact of the input part, the contact corresponding to the input area, by a press-down operation toward the input area of the display part is provided above the input part. Therefore, the pressing operation toward the input part is performed through the physical operating button. As a result, an intuitive operational feeling and a click feeling can be obtained by pressing down the operating button.

As a result, since an operation can be performed by a physical action as pressing down the operating button, it is not necessary to visually confirm as to whether the operation has been completed in each operation. Therefore, a switch unit that can provide a speed feeling and a quick feeling can be provided.

The operating button is made of a translucent rectangular parallelepiped member. Therefore, an image in an input area displayed on the display part is reflected by a side wall of the three-dimensional operating button made of a rectangular parallelepiped member, and thereby enters the visual field of a player. As a result, the image in the input area displayed on the display part is viewed doubly, which makes it difficult to view the display. When the switch unit is placed in an inclined manner, the side wall of the operating button is inclined. Therefore, this phenomenon is further enhanced. In particular, a display on a side wall of the operating button, the side wall positioned on the far side with respect to a player, becomes difficult to view. In addition, a deeper sense of the image is thereby caused.

In view of this, in the embodiment of the present invention, at least one side wall of the operating button made of a rectangular parallelepiped member is formed into an inclined surface that widens outwardly toward the bottom.

Therefore, by arranging the inclined surface which is formed on one side wall of the operating button and widens outwardly toward the bottom on the far side with respect to a player, it is possible to prevent light reflected by the side wall from entering eyes of a player. In addition, a deeper sense of an image can also be reduced.

Therefore, it is possible to provide the switch unit that is capable of providing an intuitive operational feeling without making it difficult to view a display of the display part during an input operation.

According to the embodiment of the invention, it is possible to provide the game machine that is provided with the switch unit capable of providing an intuitive operational feeling without making it difficult to view a display of the display part during an input operation.

As described above, in the switch unit of the embodiment of the present invention, it is preferred that at least one pair of opposite side walls of the operating button which is made of a rectangular parallelepiped member be formed into inclined surfaces each of which widens outwardly toward the bottom of the operating button, and an inclined angle of one inclined surface of one of the pair of opposite side walls be larger than an inclined angle of the other inclined surface of the other side walls.

When considering a case where inclined surfaces are formed on two side walls of the operating button made of a rectangular parallelepiped member, light reflected by the front and back side walls is likely to enter eyes of a player.

In view of this, in the embodiment of the present invention, inclined surfaces each of which widens outwardly toward the bottom are formed on at least one pair of opposite side walls of the operating button made of a rectangular parallelepiped member. As a result, it is possible to prevent light reflected by the front and back side walls from entering eyes of a player. Specifically, in the front and back side walls, light reflected by the back side wall is more likely to enter eyes of a player than light reflected by the front side wall.

Therefore, in the embodiment of the present invention, an inclined angle of one inclined surface of one of the pair of opposite side walls is made larger than an inclined angle of the other inclined surface of the other side walls. As a result, it is possible to appropriately prevent light reflected by the front and back side walls from entering eyes of a player.

Further, in the switch unit of the embodiment of the present invention, four side walls of the operating button made of a rectangular parallelepiped member can be formed into inclined surfaces each of which widens outwardly toward the bottom.

That is, when viewing from above the operating button in the switch unit that is horizontally placed, light reflected by the front, back, right and left side walls enters eyes. In view of this, in the embodiment of present invention, the front, back, right and left side walls of the operating button are formed into inclined surfaces each of which widens outwardly toward the bottom, that is, inclined surfaces each of which widens outwardly toward the bottom are formed also on the respective right and left side walls of the operating button. As a result, it is possible to prevent light reflected by the front, back, right and left side walls of the operating button from entering eyes.

Further, in the switch unit of the embodiment of the present invention, the elastic member can be provided between the operating button and the input part, and the operating button can have the contact pressing portions formed on the lower four corners of the operating button. Further, a cavity can be formed in the elastic member at a part or all of positions that make contact with the contact pressing portions formed on the lower four corners of the operating button.

Accordingly, when the operating button is pressed down, and the contact pressing portions formed on the lower four corners of the operating button come into contact with the elastic member, a part of the elastic member where the cavity exists is dented, and the dented part presses the input part. Therefore, the elasticity due to the existence of the cavity in the elastic member provides a moderate press-down feeling to the operating button. As a result, a further intuitive operational feeling and click feeling can be provided.

Further, in the switch unit of the embodiment of the present invention, the operating button made of a rectangular parallelepiped member can have support ends on one side of the operating button, and can therefore be provided so as to be freely pressed down by pivoting around the support ends on the one side.

That is, when the physical operating button is provided above the input part, and a contact input is employed, the input part is switched on by pressing any part of the operating button made of a rectangular parallelepiped member. On the other hand, respective parts of the input part are successively switched on with respect to one input area of the display part, namely, multi-point contact occurs.

Therefore, in the embodiment of the present invention, the operating button made of a rectangular parallelepiped member has the support ends on one side of the operating button, and is provided so as to be freely pressed down by pivoting around the support ends on the one side. As a result, since the operating button has a cantilever structure, it is possible to prevent multi-point contact and provide a stable press-down feeling.

Further, in the embodiment of the present invention, it is possible that cavities be formed in the elastic member at all positions making contact with the contact pressing portions formed on the four lower corners of the operating button, and the cavities of the elastic member, being located at positions making contact with contact pressing portions on two corners on one side of the contact pressing portions formed on the four lower corners of the operating button, be filled with fillers.

As a result, it is not necessary to form the support/fixation points on the elastic member, and it is therefore possible to prevent the number of components from increasing.

Further, as described above, the game machine of the embodiment of the present invention is provided with the above switch unit.

Accordingly, an effect of providing the switch unit and the game machine that are capable of providing an intuitive operational feeling without making it difficult to view a display of the display part during an input operation can be achieved.

The present invention is not limited to the above embodiment, and various modifications can be made within the scope of the invention defined in the accompanying claims. The technical scope of the present invention also includes an embodiment that can be obtained by appropriately combining technical means disclosed in the embodiment.

The present invention relates to a switch unit in which an operational feeling of a touch panel is improved and a game machine equipped with the same. The present invention can be broadly applied to a switch unit that has an input part above a display part such as an LCD. The game machine can be applied not only to a slot machine, but also to a poker game machine, a mah-jong game machine, a card game machine and the like.

The invention claimed is:

1. A switch unit comprising:
a display part configured to display an image in at least one input area;
an input part provided above the display part, the input part comprising a contact, wherein when the input part is pressed toward the at least one input area displayed on the display part, the contact corresponding to the input area is conducted;
an operating button configured to cause conduction of the contact of the input part, the contact corresponding to the input area, by a press-down operation toward the input area of the display part; and
an operating button case having an opening for the access of the operating button,
wherein the operating button is made of a translucent rectangular parallelepiped member, and at least one side wall of the translucent rectangular parallelepiped member is formed into an inclined surface widening outwardly toward bottom of the operating button,
wherein at least one pair of opposite side walls of the operating button made of the translucent rectangular parallelepiped member are formed into inclined surfaces each widening outwardly toward the bottom of the operating button,
wherein an inclined angle of one inclined surface of one of the pair of opposite side walls is larger than an inclined angle of the other inclined surface of the other side walls,
wherein the input part is configured to detect the press-down operation of the operating button and is provided with a light-emitting part for illuminating a circumference of the operating button, wherein a light diffusion portion and a light guide portion are being formed on the operating button case, wherein the light guide portion is configured to prevent light emitting from the light emitting part to reach the operating button, and wherein the light diffusion portion configured to face the light emitting part to illuminate the circumference of the operating button.

2. The switch unit according to claim 1, wherein four side walls of the operating button made of the translucent rectangular parallelepiped member are formed into inclined surfaces each widening outwardly toward the bottom of the operating button.

3. The switch unit according to claim 2, further comprising an elastic member provided between the operating button and the input part, wherein the operating button comprises contact pressing portions formed on four lower corners of the operating button, and wherein a cavity is formed in the elastic member at all or a part of positions making contact with the contact pressing portions formed on the four lower corners of the operating button.

4. The switch unit according to claim 3, wherein the operating button made of the translucent rectangular parallelepiped member comprises support ends on one side thereof, and is provided so as to be freely pressed down by pivoting around the support ends.

5. The switch unit according to claim 4, wherein cavities are formed in the elastic member at all positions making contact with the contact pressing portions formed on the four lower corners of the operating button, and wherein the cavities of the elastic member, being located at positions making contact with contact pressing portions on two corners on one side of the contact pressing portions formed on the four lower corners of the operating button, are filled with fillers.

6. The switch unit according to claim 1, further comprising an elastic member provided between the operating button and the input part, wherein the operating button comprises contact pressing portions formed on four lower corners of the operating button, and wherein a cavity is formed in the elastic member at all or a part of positions making contact with the contact pressing portions formed on the four lower corners of the operating button.

7. The switch unit according to claim 6, wherein the operating button made of the translucent rectangular parallelepiped member comprises support ends on one side of the operating button, and is provided so as to be freely pressed down by pivoting around the support ends.

8. The switch unit according to claim 7, wherein cavities are formed in the elastic member at all positions making contact with the contact pressing portions formed on the four lower corners of the operating button, and wherein the cavities of the elastic member, being located at positions making contact with contact pressing portions on two corners on one side of the contact pressing portions formed on the four lower corners of the operating button, are filled with fillers.

9. The switch unit according to claim 1, wherein four side walls of the operating button made of the translucent rectangular parallelepiped member are formed into inclined surfaces each widening outwardly toward the bottom of the operating button.

10. The switch unit according to claim 9, further comprising an elastic member provided between the operating button and the input part, wherein the operating button comprises contact pressing portions formed on four lower corners of the operating button, and wherein a cavity is formed in the elastic member at all or a part of positions making contact with the contact pressing portions formed on the four lower corners of the operating button.

11. The switch unit according to claim 10, wherein the operating button made of the translucent rectangular parallelepiped member comprises support ends on one side thereof, and is provided so as to be freely pressed down by pivoting around the support ends.

12. The switch unit according to claim 11, wherein cavities are formed in the elastic member at all positions making contact with the contact pressing portions formed on the four lower corners of the operating button, and wherein the cavities of the elastic member, being located at positions making contact with contact pressing portions on two corners on one side of the contact pressing portions formed on the four lower corners of the operating button, are filled with fillers.

13. The switch unit according to claim 1, further comprising an elastic member provided between the operating button and the input part, wherein the operating button comprises contact pressing portions formed on four lower corners of the operating button, and wherein a cavity is formed in the elastic member at all or a part of positions making contact with the contact pressing portions formed on the four lower corners of the operating button.

14. The switch unit according to claim 13, wherein the operating button made of the translucent rectangular parallelepiped member comprises support ends on one side thereof, and is provided so as to be freely pressed down by pivoting around the support ends.

15. The switch unit according to claim 14, wherein cavities are formed in the elastic member at all positions making contact with the contact pressing portions formed on the four lower corners of the operating button, and wherein the cavities of the elastic member, being located at positions making contact with contact pressing portions on two corners on one side of the contact pressing portions formed on the four lower corners of the operating button, are filled with fillers.

16. A game machine comprising a switch unit, said switch unit comprising:

a display part configured to display an image in at least one input area;

an input part provided above the display part, the input part comprising a contact, wherein when the input part is pressed toward the at least one input area displayed on the display part, the contact corresponding to the input area is conducted;

an operating button configured to cause conduction of the contact of the input part, the contact corresponding to the input area, by a press-down operation toward the input area of the display part; and an operating button case having an opening for the access of the operating button, wherein the operating button is made of a translucent rectangular parallelepiped member, and at least one side wall of the translucent rectangular parallelepiped member is formed into an inclined surface widening outwardly toward bottom of the operating button, wherein at least one pair of opposite side walls of the operating button made of the translucent rectangular parallelepiped member are formed into inclined surfaces each widening outwardly toward the bottom of the operating button, wherein an inclined angle of one inclined surface of one of the pair of opposite side walls is larger than an inclined angle of the other inclined surface of the other side walls, wherein the input part is configured to detect the press-down operation of the operating button and is provided with a light-emitting part for illuminating circumference of the operating button, wherein a light diffusion portion and a light guide portion are being formed on the operating button case, wherein the light guide portion is configured to prevent light emitting from the light emitting part to reach the operating button, and wherein the light diffusion portion configured to face the light emitting part to illuminate the circumference of the operating button.

* * * * *